US011915579B2

United States Patent

(12) United States Patent
Raj et al.

(10) Patent No.: US 11,915,579 B2
(45) **Date of Patent: *Feb. 27, 2024**

(54) APPARATUS AND METHODS FOR DISTRIBUTING AND DISPLAYING COMMUNICATIONS

(71) Applicant: THINXTREAM TECHNOLOGIES PTE. LTD., Midpoint Orchard (SG)

(72) Inventors: Ranga Raj, Bangalore (IN); Laxman Bhat, Karnataka (IN); Sanjiv Shet, Bangalore (IN)

(73) Assignee: THINXTREAM TECHNOLOGIES PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,417

(22) Filed: Mar. 28, 2022

(65) Prior Publication Data

US 2022/0238008 A1 Jul. 28, 2022

Related U.S. Application Data

(63) Continuation of application No. 16/708,362, filed on Dec. 9, 2019, now Pat. No. 11,308,790, which is a continuation of application No. 15/467,662, filed on Mar. 23, 2017, now Pat. No. 10,504,357, which is a continuation of application No. 14/542,885, filed on Nov. 17, 2014, now Pat. No. 9,607,503, which is a (Continued)

(51) Int. Cl.

*G08B 27/00* (2006.01)
*G08B 21/02* (2006.01)

(52) U.S. Cl.

CPC .......... *G08B 27/005* (2013.01); *G08B 21/02* (2013.01); *G08B 27/00* (2013.01); *G08B 27/006* (2013.01); *G08B 27/008* (2013.01)

(58) Field of Classification Search

CPC .... G08B 27/00; G08B 27/005; G08B 27/006; G08B 27/008; G08B 21/02

See application file for complete search history.

(56) References Cited

U.S. PATENT DOCUMENTS 7,764,185 B1 * 7/2010 Manz .................. G08B 27/005 340/601
8,068,808 B2 * 11/2011 Smith .................. G08B 25/016 455/404.2

(Continued)

*Primary Examiner* — Hoi C Lau

(74) *Attorney, Agent, or Firm* — Michael D. Eisenberg

(57) ABSTRACT

Methods and systems are disclosed for event management, allowing authorized users or authorities to distribute and display communications on digital displays. In one aspect, an event management communications system receives event data sent from a detection system comprised of a network of sensors. The event management communications system processes the event data to determine an event perimeter, and then selects one or more digital displays based upon the event data or the determined event perimeter. Next, the event management communications system authors one or more contextual communications corresponding to the one or more digital displays and sends said one or more authored communications to said one or more digital displays, thereby allowing the one or more digital displays to display the corresponding one or more communications to a relevant, identified audience.

6 Claims, 5 Drawing Sheets

Related U.S. Application Data continuation of application No. 12/687,786, filed on Jan. 14, 2010, now Pat. No. 8,917,176.

(56) References Cited

U.S. PATENT DOCUMENTS

| | | | | |
|---|---|---|---|---|
| 8,275,347 | B2 * | 9/2012 | Sennett | H04W 4/90 455/404.1 |
| 8,509,803 | B2 * | 8/2013 | Gracieux | H04W 4/029 455/456.1 |
| 8,825,092 | B2 * | 9/2014 | Sennett | H04W 76/50 455/466 |
| 8,917,176 | B2 * | 12/2014 | Raj | G08B 27/006 340/540 |
| 9,607,503 | B1 * | 3/2017 | Raj | G08B 27/005 |
| 10,504,357 | B2 * | 12/2019 | Raj | G08B 27/005 |
| 11,308,790 | B2 * | 4/2022 | Raj | G08B 27/00 |
| 2003/0069002 | A1 * | 4/2003 | Hunter | G09F 27/00 455/404.2 |
| 2004/0080421 | A1 * | 4/2004 | Wunderlich | G08B 21/0288 340/573.4 |
| 2008/0268816 | A1 * | 10/2008 | Wormald | H04W 68/00 455/412.2 |
| 2009/0247111 | A1 * | 10/2009 | Sennett | H04W 4/90 455/404.1 |
| 2009/0247114 | A1 * | 10/2009 | Sennett | H04W 4/90 455/404.1 |
| 2009/0264094 | A1 * | 10/2009 | Smith | H04W 76/50 455/404.2 |
| 2009/0289844 | A1 * | 11/2009 | Palsgrove | A01K 15/021 342/357.55 |
| 2010/0048222 | A1 * | 2/2010 | Gracieux | H04L 67/306 455/456.1 |
| 2011/0169634 | A1 * | 7/2011 | Raj | G08B 27/00 340/540 |
| 2017/0193808 | A1 * | 7/2017 | Raj | G08B 27/008 |
| 2020/0111344 | A1 * | 4/2020 | Raj | G08B 27/006 |
| 2022/0238008 | A1 * | 7/2022 | Raj | G08B 27/00 |

* cited by examiner

APPARATUS AND METHODS FOR DISTRIBUTING AND DISPLAYING COMMUNICATIONS

CROSS-REFERENCE TO RELATED APPLICATION

This application is a continuation of U.S. application Ser. No. 16/708,362 entitled "Apparatus and Methods for Distributing and Displaying Communications" which in turn is a continuation of U.S. application Ser. No. 15/467,662 entitled "Apparatus and Methods for Distributing and Displaying Emergency communications," filed Mar. 23, 2017 which in turn is a continuation of U.S. application Ser. No. 14/542,885 entitled "Apparatus and Methods for Distributing and Displaying Emergency communications," filed Nov. 17, 2014 which in turn is a continuation of U.S. application Ser. No. 12/687,786 entitled "Apparatus and Methods for Distributing and Displaying Emergency communications," filed Jan. 14, 2010. The entire teachings of the above application are incorporated herein by reference.

FIELD

The field of the invention relates to distributing and displaying emergency communications and in particular to systems and methods for utilizing digital displays and Out-of-Home (OOH) digital signage systems or existing advertising or general communications systems to provide emergency communications information. Specifically, the invention relates to a network of sensors and networked computing devices for aggregating sensor data into an emergency management communications system, determining an event perimeter, and providing appropriate emergency communications across digital displays to effectively engage affected populations.

RELATED ART

Over the past several years a number of natural and manmade events have occurred in locations around the world that have affected the safety of human populations. These events range from natural disasters, such as earthquakes, tsunamis, fires, and floods as well as manmade events such as hostage situations or terrorist attacks. In most cases, authorities in charge of saving lives and managing the event have had only a limited set of communications methods available to provide accurate information to those in need of the information. The authorities have had to rely on broadcast media agents, such as radio and television, and the Emergency Alert System (EAS) to distribute this information.

Traditional emergency alerts such as broadcast networks or one-to-one communication methods, however, often communicate information to those who either do not need it or to those who should not have access to it. This can cause confusion and inefficiency in solving the event or emergency. Warnings are most effective when delivered to just the people at risk. If people not at risk are warned, the tendency is to ignore future warnings.

Because of previous tragedies on American college campuses, some colleges have deployed SMS based distribution systems to utilize the mobile phones that a large percentage of students and staff own. Unfortunately, these systems can saturate the telephone network due to the population density near the event. With an overloaded network, such SMS communication methods are both ineffective and degrade the event communication completion time.

Digital displays and Out-Of-Home (OOH) digital signage networks that are being deployed for use in advertising can also be leveraged for visual emergency communication. With the growth of OOH Advertising that utilizes display screens that are under the control of an Advertising Network Operator (ANO), these assets can also be used to present audience specific information during an emergency situation that can augment other communications channels. These systems can deliver venue and audience specific messages that complement existing emergency networks. The power of narrowcasting, which is the ability to send specific messages to different sets of audience based on the location, demography, or role of the audience watching a screen, is a unique capability that can be leveraged for emergency communication.

The system disclosed herein presents an interface to authorities that allow them to adjust an event perimeter relating to an affected population. Authorities can adjust the affected perimeter or distribute situation updates over this network. Message updates may be standardized or can be customized by including specific details. Additionally this interface can be used to signal an end to the event and return the full system to its pre-event operating state.

U.S. Published Patent Application No. 2008/0034114, entitled, "System and Method for Managing Emergency Notifications Over Network," discloses a communications framework for managing event and emergency notification over a network. It does not disclose using sensors or a sensor network to detect an event, nor does it disclose using sensor or event data to determine an event perimeter. Furthermore, the application does not disclose the overriding of an advertising network to display emergency communications, nor does it disclose the use of metadata in digital signage systems.

As a result of the many problems inherent in traditional and more recent event and disaster communications systems, there is a need to develop more efficient and narrowcast-implemented methods of distributing and displaying emergency communications.

SUMMARY

Methods and systems are disclosed for event and/or disaster management, allowing authorized users or authorities to distribute and display event based or emergency communications on digital displays.

In one aspect, an event or emergency management communications system receives event data sent by a detections system comprised of a network of sensors. The event management communications system processes the event data to determine an event perimeter, and then selects one or more digital displays based upon the event data or the determined event perimeter. Next, the event management communications system authors one or more communications corresponding to the one or more digital displays and sends said one or more authored communications to said one or more digital displays, thereby allowing the one or more digital displays to display the corresponding one or more communications to the relevant or/and affected populations.

In one aspect, the digital displays comprise digital signage systems, OOH digital signage systems, monitors, or access devices.

In one aspect, the event management communications system queues one or more of the communications until it receives approval from an authority for one or more of the communications.

In one aspect, the event management communications system sends the event perimeter, the one or more selected digital displays, and the one or more emergency communications to an event message distribution system, wherein the event message distribution system sends the one or more event communications to the one or more corresponding interfaces. In another aspect, the event management communications system sends the event perimeter, the one or more selected digital displays, and the one or more event communications to one or more advertising network operators, wherein the one or more advertising network operators sends the one or more event communications to the one or more corresponding digital displays for display.

In one aspect, the emergency management communications system adjusts the event perimeter based on environmental conditions, situational awareness data, or event data; selects or de-selects one or more digital displays based upon the adjusted event perimeter; and sends the one or more emergency communications to the one or more corresponding selected digital displays to allow the one or more emergency communications to reach an optimal number of the affected population. In another aspect, the emergency management communications system edits the one or more emergency communications based on environmental conditions, situational awareness data, or event data, and sends the one or more edited emergency communications to the one or more corresponding digital displays.

In one aspect, the emergency detection system comprises a network of sensors, alert feeds, or data sources. In another aspect, the network of sensors, alert feeds, or data sources further comprise fire alarms, biosensors, chemical sensors, thermal sensors, electromagnetic sensors, mechanical sensors, optical sensors, ionizing sensors, acoustic sensors, photoelectric sensors, biological sensors, biohazard sensors, radiological sensors, geodetic sensors, surveillance cameras, seismometers, microphones, phone taps, microphones, cameras, weather sensors, micro-electro-mechanical-systems (mems), Bluetooth, Near Field Communications (NFC), or radio-frequency identification.

In one aspect, the digital displays comprise metadata. In another aspect, the metadata further comprises location data, venue type, interface format, interface size, geo-spatial data, user profiles, time of day, or time of year. In another aspect, the one or more emergency communications comprises web feed, text crawl, email, instant message, video data, or audio data.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

Figure 1:
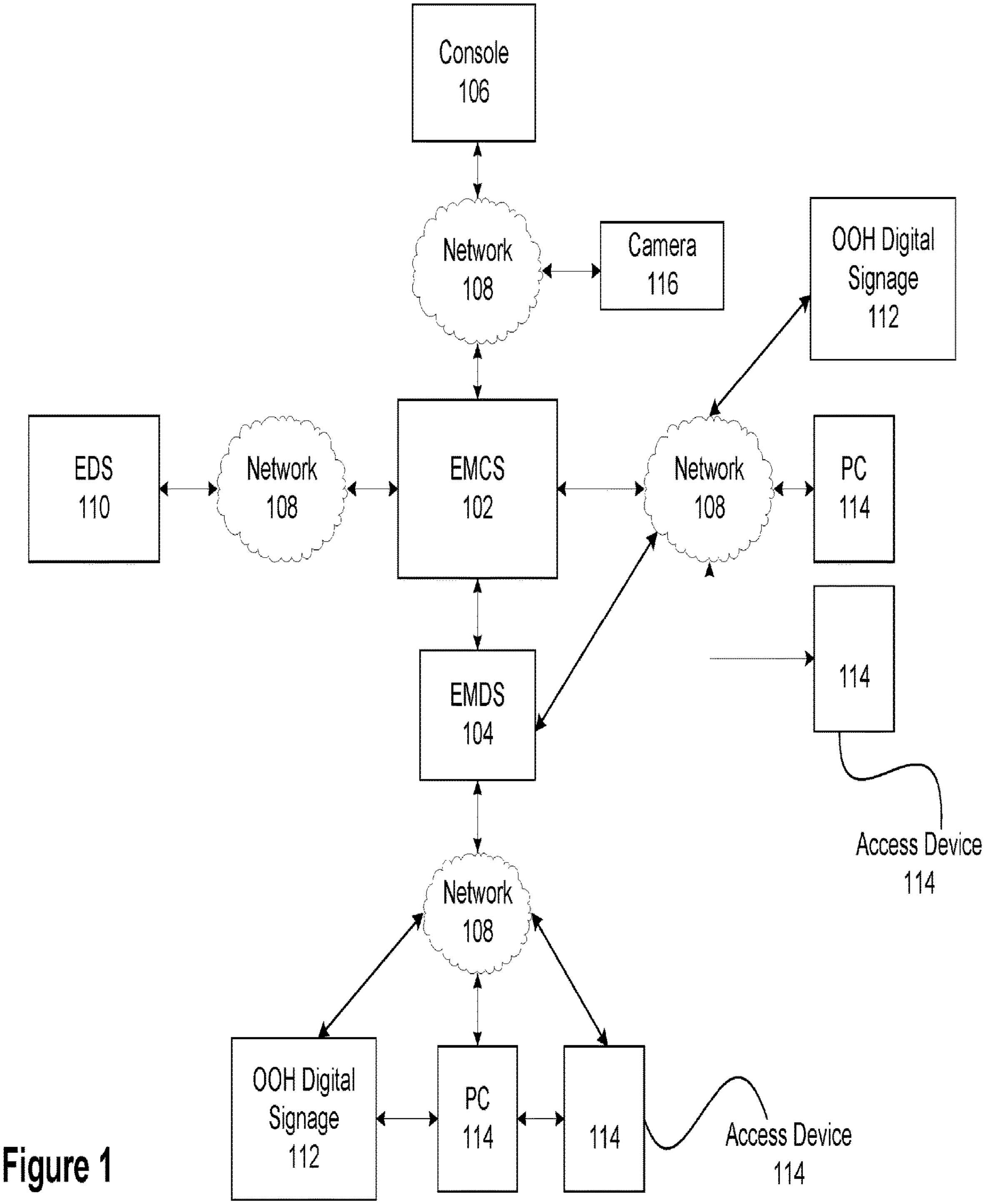
FIG. 1 is a block diagram showing a system for distributing and displaying emergency communications on OOH digital signage systems and other digital displays.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present embodiments disclose systems and methods for allowing authorized users or authorities to distribute and display emergency communications on digital displays, and specifically, OOH digital signage systems. An emergency management communications system receives event data, processes said data to determine an event perimeter, then selects one or more digital signage systems based upon the event perimeter or event data. The emergency management communications system authors and then sends one or more emergency communications corresponding to the one or more digital displays, thereby allowing the one or more digital displays to display the one or more emergency communications. The emergency communications may be automatically authored by the system, or may be authored or edited manually by an event manager. Specific emergency communications may be sent to specific populations and facilities. This allows emergency communications to be quickly and efficiently delivered to first responders, medical personnel, affected populations, etc. The event perimeter may be adjusted as necessary to reach the maximum number of affected citizens or may be adjusted for other reasons such as weather conditions. Upon termination of the event, the system may automatically adjust the event perimeter, terminate the event perimeter, initiate a cool down phase, or terminate the emergency communication(s). The system has a test mode allowing it to distribute and present specific media.

Alternate embodiments include systems and methods for distributing and displaying non-emergency, specific event based communications. A first example embodiment includes a system and method for implementing a flash sale in a certain area using OOH or other displays. An OOH communications management system receives a flash sale event data sent by an authorized advertiser over the Internet. The OOH communications management system processes the flash sale event data to determine an event perimeter, and then selects one or more digital displays based upon the event data or the determined perimeter. Next, the OOH communications management system authors one or more flash sale communications corresponding to the one or more OOH digital displays and sends said one or more flash sale communications to said one or more OOH digital displays, thereby allowing the one or more digital displays to display the corresponding one or more flash sale communications to the targeted populations.

A second example embodiment includes a system and method for implementing a flash sale in a certain area using mobile phone displays. A Telco communications management system receives a flash sale event data sent by an authorized advertiser over the Internet. The Telco communications management system processes the flash sale event data to determine an event perimeter, and then selects one or more mobile phone displays based upon the event data or the determined perimeter. Next, the Telco communications management system authors one or more flash sale communications corresponding to the one or more mobile phone digital displays and sends the said one or more flash sale communications to said one or more mobile phone digital displays, thereby allowing the one or more mobile phone digital displays to display the corresponding one or more flash sale communications to the targeted populations.

A third example embodiment includes a system and method for information dissemination to spectators attending an event (such as a match, a game, a concert, etc.) at a stadium and people (say) near the area (while both OOH and Telco models can be applied, including variations thereof, only the Telco model is enumerated below). A Telco communications management system receives event data or logistics event data sent by an authorized administrator over the Internet. The Telco communications management system processes the match/logistics event data to determine an event perimeter (stadium and its periphery), and then selects one or more mobile phone displays based upon the event data or the determined perimeter. Next, the Telco communications management system authors one or more event/logistics communications corresponding to the one or more mobile phone digital displays and sends said one or more event/logistics communications to the said one or more mobile phone digital displays, thereby allowing the one or more mobile phone digital displays to display the corresponding one or more event/logistics communications to the targeted populations.

A fourth example embodiment includes a system and method for information dissemination to commuters at a travel port (airport/train station/bus station) and people near the area (while both OOH and Telco models can be applied, including variations thereof, only the Telco model is enumerated below). A Telco communications management system receives a travel event data or logistics event data sent by an authorized administrator over the Internet. The Telco communications management system processes the travel/logistics event data to determine an event perimeter (travel port and its periphery), and then selects one or more mobile phone displays based upon the event data or the determined perimeter. Next, the Telco communications management system authors one or more travel/logistics communications corresponding to the one or more mobile phone digital displays and sends the said one or more authored communications to the said one or more mobile phone digital displays, thereby allowing the one or more mobile phone digital displays to display the corresponding one or more communications to the targeted populations.

FIG. 1 is a block diagram illustrating a system for distributing and displaying emergency communications on OOH digital signage systems and other digital displays, in accordance with one of embodiment of the present invention. An emergency management communications system (EMCS) 102 may be comprised of a central computer or server, the central computer or server comprising a CPU with standard x86 architecture, memory, storage, and a network device. The computer or server may run software comprised of an operating system layer running application software, web-based applications, or client-server software, with a user interface. There may be a single computer or plurality of computers or servers supporting the preferred embodiment of the present invention. The computers or servers may be coupled via a network device to a local area network (LAN), a wide area network (WAN), an intranet, the Internet, or the World Wide Web. Coupling methods to data networks may be via wireless networking technology, such as Wi-Fi, Bluetooth, and NFC or via Ethernet over twisted pair cables, such as 10BASE-T, or other method capable of Megabit per second or Gigabit per second data transfer rates. Network connectivity and architecture may support an emergency communications network to provide data transfer and communications for the preferred system and methods.

The preferred embodiment of the EMCS 102 may include an emergency management communications console (console) 106. The console 106 may be embodied as a monitor, computer screen, LCD screen, liquid crystal display, plasma screen, LED screen, Light Emitting Diode, or other electronic display. The console 106 may be embedded in the EMCS 102 or may be a separate computing device coupled to the EMCS 102. Console 106 and/or EMCS 102 runs security software capable of authenticating event managers and other authorized users of the system (collectively "Authorities"), thereby preventing unauthorized users from breaching the system and distributing unapproved or inappropriate messages onto digital interfaces 112 including digital signage systems or other public displays. Authentication may be achieved by integrating into existing infrastructures such as centralized password management as well as physical security devices such as smart cards or biometric information. Exemplary embodiments of authentication are further provided in the description of FIG. 5 below. Console 106 may allow a user interface for managing the emergency communications network and system. Authorities with access availability may utilize the console 106 to edit or approve emergency communications or adjust data messages provided over the emergency communications network. Additionally, authorities may use the console 106 to adjust the perimeter of impact established by the network of sensors 306 in accordance with the system and method. Furthermore, authorities may provide and distribute situation updates over the network via the user interface provided by the console. Also, messages or communications desired to signal an event being over may be provided to the network via the console 106. Authorities or other designated access users may provide such messages or content described herein and may further return the system to its pre-event operating state via the console 106. The preferred embodiment of the console 106 may include a security software layer or other access restriction method in order to properly authenticate users.

The present invention may include an emergency message distribution system (EMDS) 104. The EMDS 104 may be comprised of a server computer, a dedicated server, third party server computer, off-site server computer or other computing device. The EMDS 104 may receive data and communications from the EMCS 102 and distribute such data and communications across network 108. Receivers of such data and communication distributed by the EMDS 104 may include sensors and sensor devices 306, access devices 114, or specific networks, such as a public space network 202, a medical facility 204, or a first responder facility 206.

A preferred embodiment of the network 108 architectures of the present invention may be a computer cluster as a group of linked computers connected via a local area network (LAN). Alternatively, the computers may be arranged in distributed server architecture, such as a client-server system or a peer-to-peer architecture. The network architecture of the present system and method supports the interaction between the EMCS 102, console 106, EMDS 104, emergency detection systems 110, digital display 112, access device 114, camera 116, and various designated networks or facilities. The various networks 108 employed in the present invention may be the same, separate, or overlapping networks. In one embodiment, the network 108 is the Internet or other such widely available network such as the World Wide Web. As will become obvious to one having ordinary skill in the art, there is no limit on the type or types of networks used in the present invention to enable data transmission between the various system components In one embodiment in accordance with the present invention, the network 108 may comprise an advertising network or narrowcasting network. A narrowcasting network provides information, advertisements, and other content to a specific audience or demographic. Such narrowcasting methods provide targeted content with higher relevance and value to the particular audience or demographic served by the narrowcast. A digital signage system 112 may be configured to provide narrowcasting information based upon a variety of characteristics such as location, time of day, or event scheduling. Generally, the characteristics provided to determine the narrowcasting content provide some nexus between the narrowcast content and the demographic. Emergency communications may leverage the content relevancy of narrowcasting systems and methods in order to better provide critical emergency information.

Other networks 108 may also be utilized by the system such as an intranet, internet, World Wide Web, 3G network, GPRS system, satellite, XM, FM or HD radio, GSM or CDMA cellular technology media, RF signal media, or other landline type communications media, such as via Ethernet over twisted pair cables, such as IOBASE-T, or other method capable of Megabit per second or Gigabit per second data transfer rates, telephone cable, coaxial cable, or copper wire.

A preferred embodiment of the modes available for alert or information dissemination by and between system components may be push, pull or subscribe, broadcast, or narrowcast. For example, in push mode, EMCS 102 may "push" data to digital signages 112 or access devices 114. In pull/subscribe mode, digital signages 112 and/or access devices 114 may continuously, or at any other predefined interval, "pull" data from the EMCS 102 by sending a request to the EMCS 102. If there are no data requests pending in the EMCS 102, the EMCS 102 replies to the originating device 112 and/or 114 that there is no data. If there is a data, the EMCS 102 will send the data to the originating device 112 and/or 114. This embodiment is optimal for networks employing firewalls which are hostile to incoming "pinging" from the Internet.

Preferred embodiments of the available locations for the receiving of alert or information disseminated by the EMCS 102 may be homes, outdoors/public spaces, commute environments, the workplace, or a recreation setting with an emphasis on digital signage systems 112 within an event perimeter.

The present invention may include an emergency detection system (EDS) 110. A preferred embodiment of the present invention and system may be comprised of a plurality of sensors or sensor networks 306 as explained in greater detail in FIG. 3 below.

A preferred embodiment of the present invention includes at least one digital interface as digital signage apparatus or system 112. The emergency communications system may interface with digital signage electronic displays 112 installed in public places. Such digital signage systems 112 may preferably be embodied as a monitor, computer screen, LCD screen, liquid crystal display, plasma screen, or other electronic display. Digital signage systems 112 may be locally controlled and operated, or may be coupled to a network of digital signage displays 112 and controlled remotely via a server or other computing device. Furthermore, digital signage systems 112 may be independently managed such as those operated by Seesaw Networks™, Saaze™, Danoo™, or may be managed through an intermediary aggregator that assists in booking advertising media. Signage networks that are used for employee communication may also be integrated into the present invention. Coupling means for connecting digital signage displays and systems 112 to computing devices or servers may be via the World Wide Web.

Digital signage 112 systems may be partnered with state, local or other authorities and their associated emergency communications systems for alerting populations of an emergency via the system described herein. The power of audience or other demographic penetration and captivation may be leveraged in a digital signage system 112 to provide critical alert or emergency communications information in a disaster-affected area.

Digital signage 112 may comprise scalable server-centric platform that can be deployed across a range of infrastructures including both web hosted and internal server designs. Digital signage 112 may be programmed with metadata for event perimeter determination by EMCS 102, comprising location data, venue type, size of the signage, digital signage format, time of day, time of year, etc. Location data may comprise latitude and longitude coordinates. Digital signages 112 may be placed in fixed locations and within facilities, indoors or outdoors, such that emergency information is displayed upon them and targeted to a specific viewing audience. Public viewable screens 112 can present an overview of the event situation. For example a public screen may state that there is a bridge failure, and a specific commuter route is closed and recommend an alternative route from the location of the screen. Based on the location of the screen in the city, the displayed message can be automatically generated for guidance in route selection. Displays 112 that are placed in first responders or medical facilities can provide more specific information on the situation. For example, said displays 112 may show maps of affected areas, estimated numbers of casualties, and additional information for specific agencies to allow them to improve the management of their resources.

Digital signage 112 may be mobile, and as would be apparent to one skilled in the art, would support geo-spatial targeting. For example, digital signage 112 may be able to be placed at one location and then moved to another location as required. This type of signage 112 would require access to power (e.g. AC, DC, solar, etc.) and GPS technology for location determination by the EMCS 102 to display appropriate content. In another example, digital signage 112 may be mounted on a bus, cab, train, or other constantly-changing-location vehicle. EMCS 102 may use current location of the digital signage 112 as provided by GPS to display appropriate content such as nearby attractions or destinations. Furthermore, digital signage 112 could be used to promote specific destinations near bus or train stops. Public space network 202, as described below, may display specific media based on its proximity to attractions/destinations.

Digital signage 112 usage may vary depending on the nature of the alert or communication and its severity or timeframe. Communications for various populations or facilities may be automatically or manually triggered. Such disseminated information may comprise warnings, advisories, or watch alerts. For example, warning may alert that a hazardous event is occurring or is imminent and that the public should take immediate protective action. An advisory alert may signal that an event is occurring or is imminent. A watch alert may signal that conditions indicate the probability of occurrence of the hazard.

Furthermore, the information alert may also be an outlook, stating that the potential for a hazard exists, although the exact timing and severity is uncertain. Statements may be provided, such as detailed follow-up information to warnings, advisories, watches, or outlooks. Forecasts of events to occur may also be provided.

For example, information may be provided in public venues via OOH digital signage systems 112 with information regarding official situation updates, evacuation information, maps to nearby assistance centers, upcoming weather conditions, call for volunteers or First Responders in order to complement computer aided dispatch systems, tactical information such as travel routes and personal protection, status of other resources for instance Medical Facilities, tracking of inbound ambulances, or information dissemination within a facility or to other facilities regarding capacity. An event perimeter is preferably utilized in providing information across OOH digital signage system in accordance with the example described herein Depending on the type of content, either visual or audio, various media players or displays can be suggested depending on the nature of the audience. Under normal situations, a preferred embodiment of the system may be a full-featured OOH digital signage system 112 that can be used for either public or commercial applications. Media placement and scheduling uses a streamlined workflow system that matches media characteristics to available displays 112 including location profiles and demographic attributes that generate increased response. In addition, the platform supports multiple content zones that can be scheduled in unison or separately.

One or more access devices 114 may connect to EMCS 102 via one or more networks 108 which may be wired or wireless. In one embodiment, access device 114 is coupled to one or more digital signage 112. In other embodiment, access device 114 is independent of digital signage 112 and connects directly to EMCS 102. This embodiment may be preferred where access device 114 is a personal computer (PC) coupled to the EMCS 102 via the Internet, or where a software application runs on the access device 114. The application may be a special purpose application written specifically for communicating emergency communications or any other message (e.g. iPhone application or any smartphone application), or it may be a general purpose application such as a web browser, as should be obvious to one of ordinary skill in the art.

Access devices 114 receiving or sending data, or otherwise communicating with EMCS 102 and/or EMDS 104 via the networks 108 described above, may be comprised of digital signage systems 112 or other OOH systems capable of narrowcasting to captive demographic specific audiences. Access devices 114 may further be comprised of a web browser, cell phone, mobile computing device, pager, or other mobile telecommunications device. Access devices 114 may be further comprised of the commercially available standards of World Space media, FM or HD radio, or other LCD digital signage, TV screen, LED billboard, or other electronic monitor. Narrowcasting capabilities may additionally be leveraged in sending emergency communications to the access devices 114 described herein.

To accommodate mobile access devices 114, network 108 in one embodiment is a cellular data network, such as an EDGE, GPRS or 3G network. In another embodiment, network 108 is a Wi-Fi network. In another embodiment, the network 108 is wired and access devices 114 connect via local area networks (LAN), wide area networks (WAN), or Ethernet over twisted pair cables, such as 10BASE-T, or other method capable of Megabit per second or Gigabit per second data transfer rates. The principles disclosed herein apply to any network that allows an access device 114 to communicate with EMCS 102 and/or EMDS 104, and is preferred where the user of a mobile access device 114 wishes to communicate via SMS, MMS, or any other text message application.

Users of access devices 114 (alert recipients) may include, but are not limited to, first responders, medical facilities or staff, the general public, internal recipients, etc., and may be arranged via a hierarchical structure of primary, secondary, or national responders. Additionally, leaders, victims and families, insurers, or schools communities of parents and children may be designated alert recipients for the preferred embodiment of the present invention. Yet a further embodiment of alert recipients may be the news media, non-government organizations (NGOs), citizens, businesses, agency specific media, or other partners. In all alert recipient configurations or types, narrowcasting is a preferred embodiment of facilitating the delivery of emergency communications to alert recipients. Furthermore, OOH digital signage systems 112 are preferably utilized in reaching alert recipients One or more cameras 116 may connect directly to EMCS 102 via network 108 or may connect indirectly to EMCS 102 via EDS 110 coupling. Types of cameras 116 include, but are not limited to, video cameras, surveillance cameras, security cameras, digital cameras, infrared cameras, etc., or any other type of visual device capable of capturing visual data.

As disclosed herein, EMCS 102, EMDS 104, console 106, EDS 110, digital signages 112, access devices 114, and cameras 116 may comprise computing devices which may comprise one or more processors and memories configured to implement the present embodiments according to one or more executable software instructions. Such computing devices include, but are not limited to personal computers such as desktop computers, workstations, notebooks, or laptop computers; cellular phones or other mobile communication devices; personal digital assistants (PDAs); media players such as audio or video players; gaming consoles or handheld gaming devices; navigation systems such as Global Positioning Systems (GPS); or any other computing devices. Such computing devices may further comprise or be coupled to peripheral devices, including but not limited to input devices such as keyboards, computer mice, trackballs, touch screens, stylus, microphones, or any other devices for facilitating input; output devices such as displays, printers, speakers, headphones, vibrational feedback devices; or any other device for providing visual, audio, or tactile output; network controllers, network interfaces, routers, switches, or any other devices for facilitating communication; etc. Furthermore, while in the present description reference is made to access devices 114, it is understood that the capabilities described herein as provided by devices 114 are not understood to be limited to mobile devices, but may also be implemented on other computing devices that may not necessarily be mobile, such as desktop or laptop computers, workstations, etc.

Figure 2:
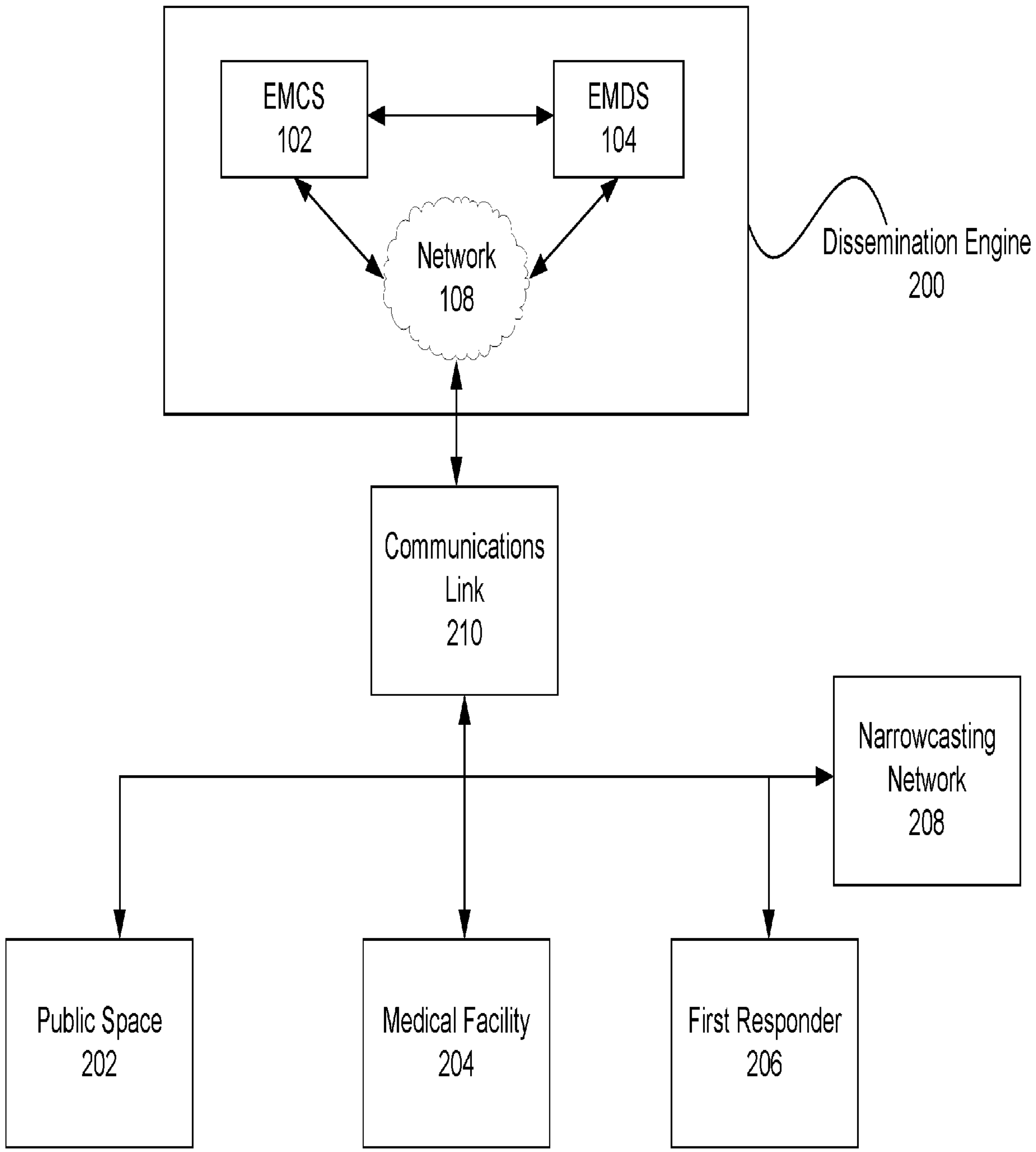
FIG. 2 is a block diagram showing specific networks optimized for narrowcasting.

FIG. 2 is a block diagram illustrating specific networks optimized for narrowcasting, such as a public space network 202, a medical facility 204, a first responder facility 206, and/or any other narrowcasting network(s) 208. As should be obvious to one skilled in the art, there is no limit to the amount of narrowcasting networks accessible by the present emergency communications system. In a preferred embodiment the present invention, narrowcasting is utilized to transmit alerts to specific agencies or recipients. OOH digital signage systems 112 are utilized to further narrowcasting objectives and effectively transmit alert, media and perimeter information with the event perimeter set by the system. Narrowcasting networks 202, 204, 206, and 208 may comprise site servers, digital signages 112, access devices 114, cameras 116, sensors or network of sensors 306, etc. EMCS 102, EDS 110, and network 108 comprise dissemination engine 200.

The methods of transmissions of all messages and content between the dissemination engine 200 and the narrowcasting networks 202-208 may be facilitated over secure and validated communications link 210 (also known as data link). The types of communications link 210 available include, but are not limited to, simplex, half-duplex, and duplex communications. Any unauthorized attempt to modify messages or content at the point of transmission 200 or display 202-208 would cause the messages or content to be rejected. In this event, a status alarm would occur from the validation process or processes causing the attempted unauthorized use to be registered on the EMCS 102 and/or EMDS 104 for authority review.

Figure 3:
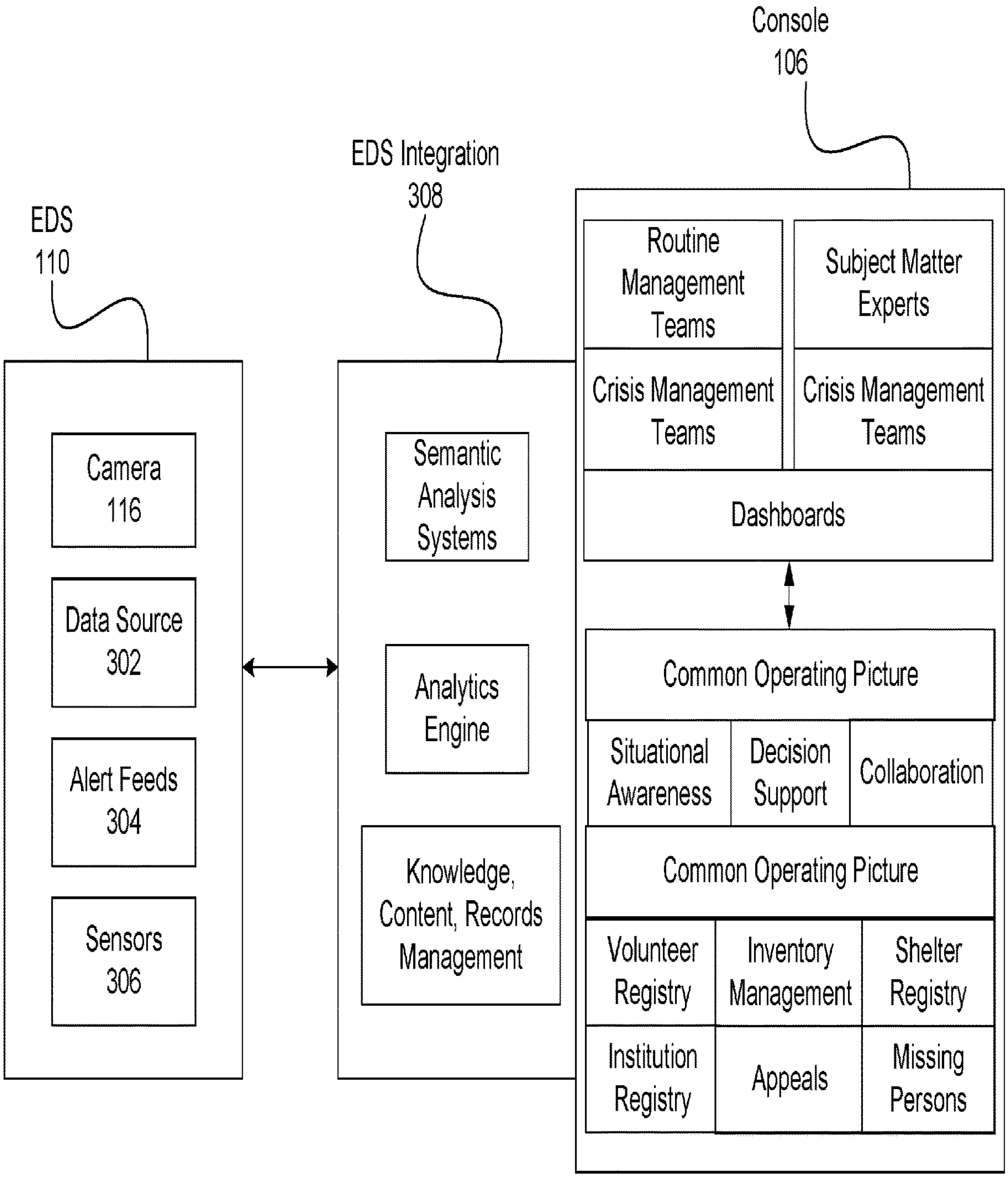
FIG. 3 is a block diagram showing an integrated emergency management platform.

FIG. 3 is a block diagram illustrating an integrated emergency management platform 300 comprising EDS 110 system, EDS integration network 308, and console 106.

The EDS 110 may comprise data sources 302, alert feeds 304, and/or sensors or network of sensors 306. Data sources 302 in accordance with a preferred embodiment of the present invention may be comprised of text files, emails, web browser data, spreadsheets, media files, or other electronic data stored on network attached storage (NAS), optical drives, tape drives, or other storage media. The data sources 302 are passed to EDS integration network 308 servers or computers that provide semantic analysis systems and processes.

Additionally, alert feeds 304 for different types of alert systems or methods such as weather, health, earthquake, tsunami, cyber, amber, homeland security, traffic, transit, environmental contamination events such as oil spills, or civic agency data, may be provided or integrated into the analytics engines of the EDS integration network 308 servers or computers of the present invention. Common alerting protocol (CAP), geographically encoded objects for RSS feeds (GeoRSS), or other standards may be utilized for integrating alert feeds into the analytics engines.

Sensors, sensor devices or other capture devices 306 may be used to detect earthquakes, fires, RFID, weather, camera 116, phone taps, or microphone data. Such captured data is passed to and integrated into the knowledge management, content management, and records management storage and computing locations. Sensor 306 types utilized in the network may be thermal, electromagnetic, mechanical, chemical, optical, ionizing, acoustic, photoelectric, biological, radiological, or geodetic. Examples of sensor 306 devices may include a fire alarm, a biosensor for detecting avian flu outbreak, or a chemical sensor for detecting chemical weapons. Sensor 306 devices may also comprise computing devices and be provided across the sensor network. Such devices may include a surveillance camera for monitoring a specific location, a seismometer for detecting and measuring earthquakes, or other device for measuring a desired condition or event.

EDS integration architecture 308 may be comprised of semantic analysis systems, analytics engines, and knowledge, content, and records management computing devices or servers, or networked servers. Architectural layout of the EDS integration system 308 may be comprised of a routine management team's data layer and a subject matter expert's data layer, each corresponding to a crisis management team's data layer. These data layers are comprised of information relating to different emergency response groups, and are collectively known as the dashboards layer. The dashboards layer passes data back and forth to the common operating picture (COP) architecture layers. Such teams described herein may provide unique operational management of the emergency communications system. For example, the routine management team may support the day-to-day availability of the system, while the crisis management team may initiate operations in the event of an emergency or other detectable event.

The COP architecture layer is comprised of three sections. The first layer is the situational awareness layer comprised of real-time access via geospatial visualization. The second layer is the decision support layer supporting incident management, and communications, secure role-based access. The third layer is the collaboration layer comprised of institutions, agencies, and real-time collaboration and/or communication. Such situational awareness, decision support, and collaboration layers provide management of criteria specific modules or components of an emergency event and the related communications necessary. For example, the collaboration layer may provide a system for supporting communications between various stakeholders in an emergency such as local officials, federal authorities, military and civilian entities.

The console 106 provides event manager the means to allow various stakeholders' access to COP, including situational awareness, decision support tools and a collaboration environment with fellow colleagues and subject matter experts. Crisis teams may then validate alerts, classify them and determine the concerned stakeholders affected by the incident and send them instructions depending on their role. Individual role based messages are then disseminated via various communication channels. Dynamic Digital Signage can be an important part of the solution as well as other OOH digital signage systems leveraging an event perimeter and or narrowcasting methodologies.

A preferred embodiment of the present invention may be an integrated public safety platform. An effective public safety response requires effective cross organization information sharing and collaboration. The COP is a key framework for ensuring the efficient collection, analysis and dissemination of incident information. The preferred embodiment of the present invention may bring together various components or integrate existing systems to form an integrated emergency management platform. Alerts may be based on real-time activity, such as real-time, sensors or cameras with analytical engines that track abnormal conditions, or through forensic analysis, such as semantic engines that help in connecting the dots from disparate information sources that are gathered in an asynchronous manner. These can be combined with official alert feeds using standards such as Common Alerting Protocol (CAP), etc., to feed into the system and display visually using a geospatial interface.

The disaster management layer is comprised of various section areas such as a volunteer registry, institution registry, inventory management, appeals, shelter registry, and a missing persons data collection registry. Thus described, it will be understood to a person having ordinary skill in the art of the invention that alternative additional disaster management section areas, criteria or solutions are possible.

Figure 4:
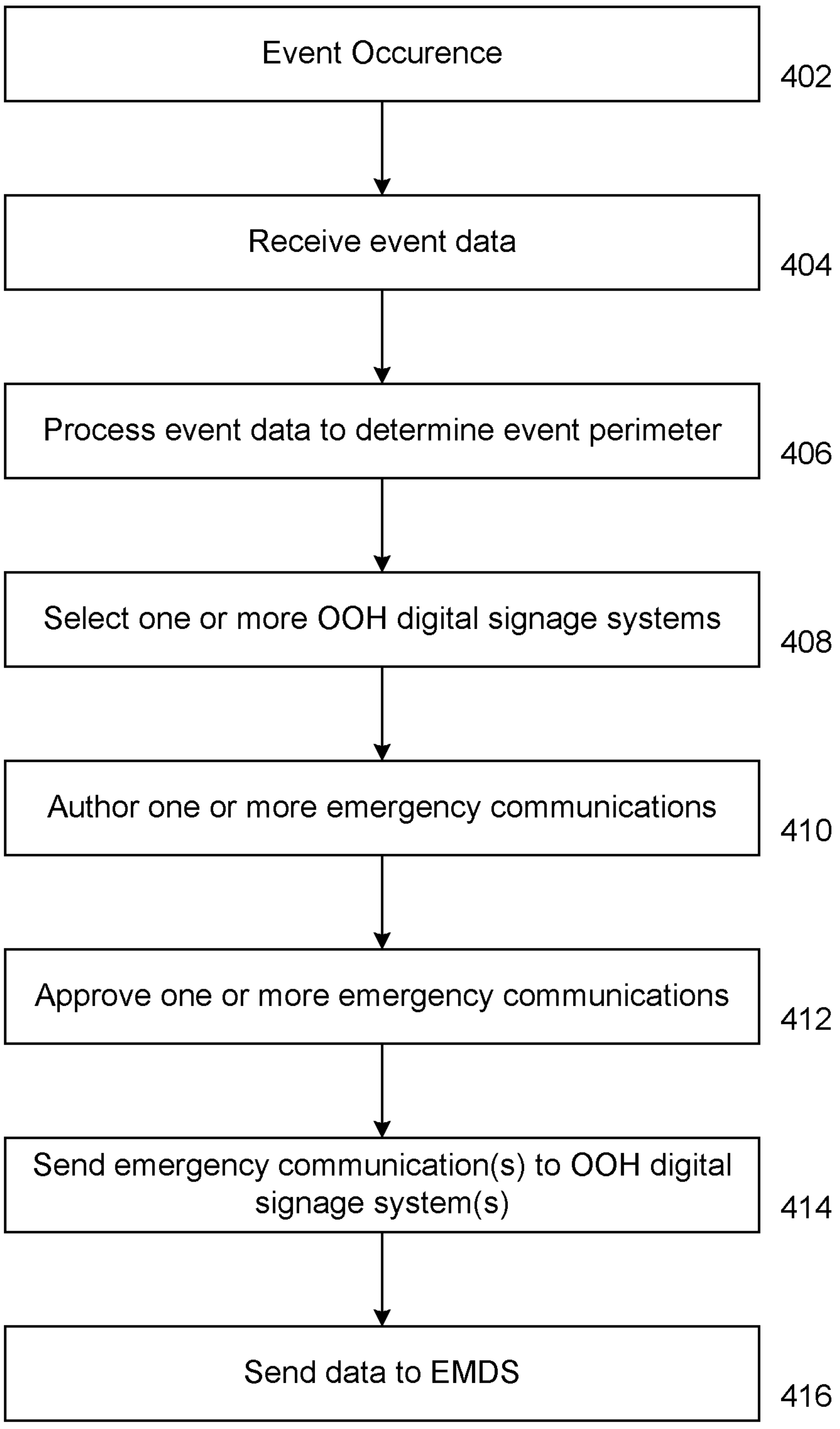
FIG. 4 is a flow diagram showing a method for automatically detecting an event and distributing and displaying emergency communications on OOH digital signage systems and other digital displays.

The present invention may be embodied in an event data flow process or multiple event data flow processes. The event data flow may be configured for an automatic event notification data flow. FIG. 4 is a flow diagram illustrating a method for automatically detecting a disaster event or other detectable event and distributing and displaying emergency communications on OOH digital signage systems and other displays. The event data flow in the emergency communications network will initially begin with a disaster event or other detectable event 402 occurring in proximity to one of the EDS 110, comprising data source 302, alert feed 304, sensor 306, or camera 116. Upon triggering EDS 110, event data will be transmitted from EDS 110 to EMCS 102 via emergency communications network 108. Transmission methods may be comprised of any of the systems and methods disclosed herein, e.g. a network device coupled to a local area network (LAN), a wide area network (WAN), an intranet, the Internet, or the World Wide Web. Coupling methods to data networks may be via wireless networking technology, such as Wi-Fi, or via Ethernet over twisted pair cables, such as 10BASE-T, or other method capable of Megabit per second or Gigabit per second data transfer rates. Modes of transmission may comprise push, pull/subscribe, broadcast, or narrowcast as discussed herein above.

At step 404, the EMCS 102 receives event data from the EDS 110. EMCS 102 is capable of sending and receiving data from EDS 110. Although as herein described the system is optimized for automatic event detection, it is important to note, as one skilled in the art will appreciate, that event information may be manually provided to the EMCS 102 via EDS 110, authorized access device 114, console 106, or any other computing device capable of relaying information to the EMCS 102.

Upon receiving event data indicating a detectable event or other sensor 306 feedbacks, EMCS 102 thereafter at step 406 may perform a variety of processing steps on the data. Processing comprises determining an event perimeter based on the detected event data provided by EDS 110 and other perimeter calculating algorithms. Processing may also include categorizing the event as an emergency, warning of impending emergency, or a false alarm.

In one embodiment, EMCS 102 may determine an event perimeter corresponding to an affected area based upon detectable events via the sensor network 306. Setting a perimeter focuses the emergency communications to affected population locations and increases narrowcasting advantages in a digital signage system. By setting an appropriate event perimeter, unnecessary emergency communications are eliminated. For example, an emergency communications may only be relevant to populations in a low-lying flood plain during a flood warning. The emergency communications would be irrelevant and cause unnecessary anxiety to those in unaffected areas, such as higher elevation locations. Through narrowcasting emergency communications via an event perimeter, targeted messages are delivered in a highly relevant and effective context. Emergency communications delivered into digital signage networks within an event perimeter increase the penetration and utility of such communications.

In another embodiment a perimeter may be determined based on the type of event and location. The event perimeter determines which OOH digital signage systems 112 or other alert mechanism will be switched from primary use to utilization for emergency communications. To better utilize the effectiveness of emergency communication via digital signage systems 112, the event perimeter may be adjusted based on environmental conditions or other characteristics that provide a nexus between the event perimeter and related communications. In setting the event perimeter, the system provides highly relevant and contextually integrated emergency communications for maximum safety effectiveness. Thus, the event perimeter may be automatically adjusted based on weather conditions. For example, some events are not as dangerous in cold weather (e.g. diesel fuel spills), so the event perimeter may be expanded or narrowed accordingly. In the example of a fire, prevailing winds may have a strong influence on the size of the fire and the system may automatically expand the perimeter based on the direction and speed of the prevailing winds.

In another embodiment of event perimeter determination, the EMCS 102 aggregates data sent from EDS 110. For example a seismometer sensor device 306 may experience detectable stimulus and this information coupled with location data over the emergency communications network to the central aggregator computer or servers. Other similarly situated seismometer sensor devices on the network may also experience detectable events and provide such data coupled with location data to the central computing devices. At the central aggregating point, the location and intensity of seismic data is processed. Additionally, special event specific algorithms may be applied to the data. The result of processing such data is the establishment of an event perimeter depicting the locations and affected areas of the seismic event.

In yet another embodiment of the event perimeter determination process, a terrorist attack may be carried out via a chemical or biological attack at a certain location. At the affected location, sensors and sensor devices 306 will provide data of the attack and transmit such data to EDS integration 308 and EMCS 102. EMCS 102 thereafter performs processing on the data to establish an event perimeter. Based upon location of the sensors 306, an event perimeter of the terrorist attack may be quickly determined. Additionally, proprietary algorithms may further analyze the data in order to effectively predict risk to imminent terrorist attacks related to the present event data and determine an event perimeter for imminent attacks.

At step 408, the EMCS 102 selects one or more digital interfaces 112 based upon the event data or the determined event perimeter, or combination thereof. In one embodiment, EMCS 102 selects digital signage system(s) 112 based on the event perimeter of said digital signage. For example, EMCS 102 may select all digital signage systems 112 within the physical boundaries of the determined event perimeter. In another embodiment, EMCS 102 selects digital signage system(s) 112 based on other attributes in metadata. For example, EDS 110 detects a terrorist attack and EMCS 102 selects only outdoor digital signages 112 within the event perimeter to communicate to the affected population to go indoors. In this example, EMCS 102 may select indoor digital signages 112 to communicate to those people already indoors to stay indoors.

At step 410, the EMCS 102 authors one or more emergency communications corresponding to the one or more digital displays 112. The emergency communication may be pre-defined (canned) according to event type or classification. Optionally, the one or more emergency communications may be edited manually by an event manager or other authority via console 106 or authorized access device 114 as further described in FIG. 5 below. Furthermore, the entirety of the one or more emergency communications may be authored manually by an event manager via console 106 or authorized access device 114 as further described in FIG. 5 below. EMCS 102 and/or event manager via console 106 or authorized access device 114 may author multiple emergency communications intended for multiple recipients. For example, after an earthquake, EMCS 102 may author a communication for first responders letting them know the epicenter of the damage caused by the earthquake. The communication may be sent to first responder PC 114 or other access devices 114, thereby broadening the in-house notification of the event to first responder staff that cannot easily see displays located in common areas. The EMCS 102 may also author a communication for the general public directing them to evacuate the epicenter. The system may send alerts to multiple agencies with universal or specific agency communications. Communications may be general and broad, or custom configured for specific recipients.

Optionally, at step 412, the one or more emergency communications may be placed in a queue for approval by the event manager prior to their dissemination in accordance with steps 414 and 416 below. This optional step may be preferred in complex emergency situations where the event manager is coordinating multiple tasks and other authorities, or staffs are responsible for authoring or editing the one or more emergency communications.

At step 414, the EMCS 102 sends the one or more emergency communications to the one or more corresponding digital signage systems 112, thereby allowing the one or more digital signage systems 112 to switch from their normal or default operating state to display the corresponding one or more emergency communications to the affected populations. Display of the communications may be in the form of web feed, text crawl, email, instant message, video, audio, or any other form of media. Emergency communications may also be sent to access devices 114. In one embodiment, the sending of the one or more emergency communications to the one or more corresponding digital displays 112 may be automatic upon the completion of authoring the message or may be automatic upon approval as provided for in step 412. In another embodiment, sending of the one or more emergency communications may be manually initiated by authorities upon message completion or upon approval.

Optionally, at step 416, the EMCS 102 may send to EMDS 104 the event perimeter, the one or more selected digital signage systems 112, and the one or more emergency communications, wherein EMDS 104 sends the one or more emergency communications to the one or more corresponding OOH digital signage systems. EMDS 104 may transmit data messages to designated access devices 114, or to specific narrowcasting networks comprising digital signage 112, such as a public space network 202, a medical facility 204, or a first responder facility 206. In one embodiment, the sending of the data to the EMDS 104 from EMCS 102 may be automatic upon the completion of authoring the message or may be automatic upon approval as provided for in step 412. In another embodiment, sending of the one or more emergency communications may be manually initiated by authorities upon message completion or upon approval. Analogously, data dissemination from EMDS 104 to designated access devices 114 or specific narrowcasting networks comprising digital signage 112 may be automatic or manual.

Upon conclusion of the event, EMCS 102 may automatically send a message to selected digital signage 112, access device 114, EMDS 104 communicating that the event is over. Digital signage 112 may be switched back to normal or default state. Additionally, the system may initiate a "cool down" phase wherein digital signage 112 displays, for a pre-defined time or reasonable time as determined by authorities, message that event has concluded, rather than instantly switching signage 112 back to default state. Event manager via console 106 or authorized access device 114 may also send such messages concluding an event.

Figure 5:
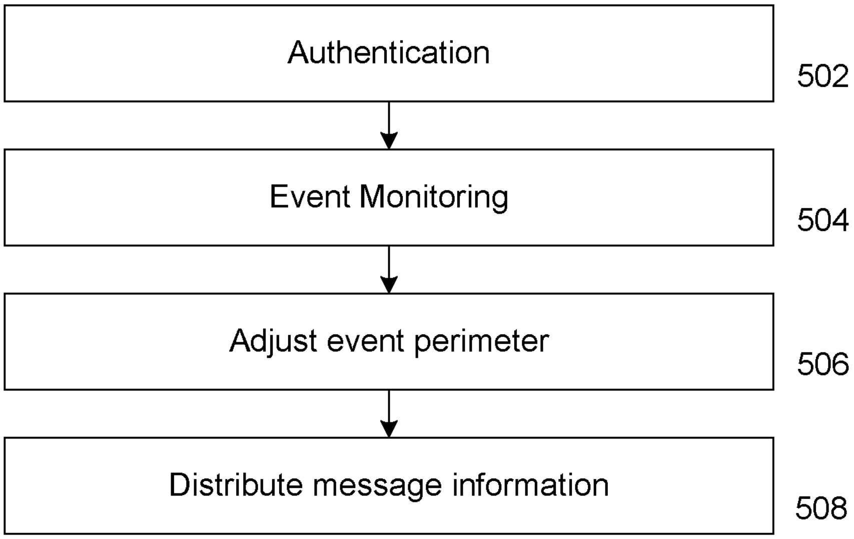
FIG. 5 is a flow diagram showing a method for manually initiating emergency event data flow.

FIG. 5 is a flow diagram illustrating the present invention configured for manually initiated emergency event data flow. The console 106 or authorized access device 114 may be invoked by authorized event managers to repurpose the OOH digital signage system 112 for coordinated emergency communication. The implementation being demonstrated uses an internet driven mapping tool to determine the role of each signage player such as first responders, leaders, media, public, government agencies, etc. The interface allows the event manager to select from a library of predefined events and the different related messages for each category of narrowcast to each type of audience. Distribution of information can be over a variety of communication formats including LAN/WAN, GPRS, UMTS/3G, satellite, or especially over FM signals. FM signals are one of the most reliable means of communication in terms of disaster survivability and thus may be a preferred embodiment of the distribution method of the system and method.

The process initially begins with event manager authentication at step 502 for security purposes. In one embodiment, the console 106 may directly authenticate the event manager by requesting a login and passwords, or other similar authentication credentials. In another embodiment, the EMCS 102 may authenticate the event manager via console 106 by requesting said credentials. In yet another embodiment, event manager may gain access via authorized access device 114. Authentication in this embodiment may be automatic or manual. For example, the EMCS 102 may automatically authenticate the user of the authorized access device 114 if the user has credentials. In another example, the EMCS 102 may authenticate automatically by referencing the phone number or device ID of an authorized access device 114 with a database of registered users. In a manual authentication example, the user manually enters his/her credentials into the authorized access device 114, wherein the authorized access device 114 sends the credentials to the EMCS 102 to authenticate the user.

Next, at step 504, the event manager commences event situation monitoring. The event manager may utilize a single console 106, multiple consoles 106, authorized access device(s) 114, or any combination thereof, for said monitoring. Also, the event manager may be able to source camera 116 feeds, choose camera locations, and control viewing options and other camera control options, and may monitor other information sources (e.g. public and private radio broadcasts, SMS, public broadcast media, etc.).

Next, at step 506, the event manager may adjust the event perimeter set by the system. In manually adjusting the event perimeter, the event manager performs a crucial analysis of the sensor 306 data and other situation monitoring results. Based upon such information and data, the event manager may properly make a determination of the affected event perimeter.

In one embodiment of the event perimeter adjustment, the event manager may be provided with situational awareness data and sensor device data from the sensor network 306. The data may be transmitted across the network to the event manager computing device for aggregation and graphical display. Based upon such pooling of sensor data, the event manager may make a determination of disaster event locations and affected areas. Thereafter, the event manager may manually make an event perimeter adjustment.

In another embodiment of event perimeter adjustment, a fire department event manager may be provided with forest fire data from a network of fire detection sensors 306. Upon aggregation and graphical representation of the sensor data on the event manager's console 106 or authorized access device 114, the event manager may make a determination of the event perimeter for containing the forest fire. Furthermore, the event manager may be provided with weather data and integrate such data into the determination of the event perimeter. For example, in a forest fire event with a strong easterly wind, the event manager may appropriately make a manual adjustment of the event perimeter based upon the conclusion that the forest fire may move into the west due to the easterly winds.

Next, at step 508, the event manager distributes message information. The message information may be embodied as an author's message. The event manager may designate a target audience, such as the public or emergency response teams. The system may send alert, media, and perimeter information for OOH digital signage systems 112 or other public screens to EMDS 104 to display. Network operator servers may accept media and transfer out to points of display that is within the perimeter. Finally, the emergency event will conclude and be otherwise finished. The event manager may then reset the system. The system may send an "event over" message or other data or message to EMDS 104 or network operators. The network operators may restore the digital signage systems 112 to display standard media provided on the OOH digital signage systems 112 or other display networks.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

The invention claimed is:

1. An event management communications computing device system configured to communicate over a network, wherein the system is caused to:
- determine a relevant perimeter based on a received event data;
- identify and select a plurality of compatible digital interfaces within the determined relevant perimeter;
- convert the received event data into a format recognizable by the selected plurality of compatible digital interfaces;
- send one or more communications to a message distribution system;
- queue the one or more communications at the message distribution system; and
- send the queued communications by the message distribution system to the selected plurality of digital interfaces within the determined relevant perimeter, based on an authorization received by the event management communications computing device system.

2. The event management communications computing device system of claim 1, wherein the system is further caused to:
- send the one or more communications to the selected plurality of digital interfaces via one or more advertizing network operators connected to the network.

3. The event management communications computing device system of claim 1, wherein the plurality of digital interfaces are comprised in a plurality of corresponding digital displays, digital signage systems, OOH digital signage systems, monitors, wireless communication devices, mobile phones, or access devices connected to the network.

4. In an event management communications computing device system configured to communicate over a network, a method comprising:
- determining a relevant perimeter based on a received event data;
- identifying and selecting a plurality of compatible digital interfaces within the determined relevant perimeter;
- converting the received event data into a format recognizable by the selected plurality of compatible digital interfaces;
- sending one or more communications to a message distribution system;
- queueing the one or more communications at the message distribution system; and
- sending the queued communications by the message distribution system to the selected one or more identified corresponding plurality of digital interfaces within the determined relevant perimeter, based on an authorization received by the event management communications computing device system.

5. The method of claim 4, further comprising:
- sending the one or more communications to the selected plurality of digital interfaces via one or more advertizing network operators connected to the network.

6. The method of claim 4, wherein the plurality of digital interfaces are comprised in a plurality of corresponding digital displays, digital signage systems, OOH digital signage systems, monitors, wireless communication devices, mobile phones, or access devices connected to the network.

* * * * *